United States Patent [19]

Templeman

[11] 3,891,353

[45] June 24, 1975

[54] JET BOOSTERS

[75] Inventor: John Joseph Templeman, Solihull, England

[73] Assignee: British Gas Corporation, London, England

[22] Filed: Mar. 7, 1973

[21] Appl. No.: 338,928

[30] Foreign Application Priority Data

Mar. 9, 1972 United Kingdom............... 10921/72

[52] U.S. Cl. ................ 417/183; 417/185; 417/193; 251/5
[51] Int. Cl. ............................................. F04f 5/48
[58] Field of Search ........... 417/185, 182, 183, 184, 417/193, 151; 251/5

[56] References Cited
UNITED STATES PATENTS

| | | | |
|---|---|---|---|
| 1,031,722 | 7/1912 | Leblanc | 417/185 |
| 1,457,799 | 6/1923 | Schmidt | 417/193 |
| 3,200,764 | 8/1965 | Saunders | 417/185 |
| 3,514,034 | 5/1970 | Cushman | 251/5 UX |
| 3,791,764 | 2/1974 | Summer | 417/193 X |

FOREIGN PATENTS OR APPLICATIONS

| | | | |
|---|---|---|---|
| 101,014 | 3/1941 | Sweden | 417/183 |

*Primary Examiner*—William L. Freeh
*Assistant Examiner*—Richard E. Gluck
*Attorney, Agent, or Firm*—Kemon, Palmer & Estabrook

[57] ABSTRACT

In a jet booster of the kind in which high pressure driving fluid is used to entrail low pressure fluid induced into the booster, and compress it to an intermediate pressure, efficiency suffers significantly if the booster is operated at other than design conditions which are for a specified volumetric throughput at predetermined fluid pressures. In a more flexible jet booster an axial nozzle by which the driving fluid enters the booster, has a plug which is longitudinally movable in the throat of the nozzle and which varies in cross section along its length so as to change the effective nozzle throat area when the plug is moved longitudinally. Also the mixing throat of the jet booster is lined with a flexible skin sleeve so that a change in inflation pressure in the sleeve alters the cross sectional area of the mixing throat.

8 Claims, 6 Drawing Figures

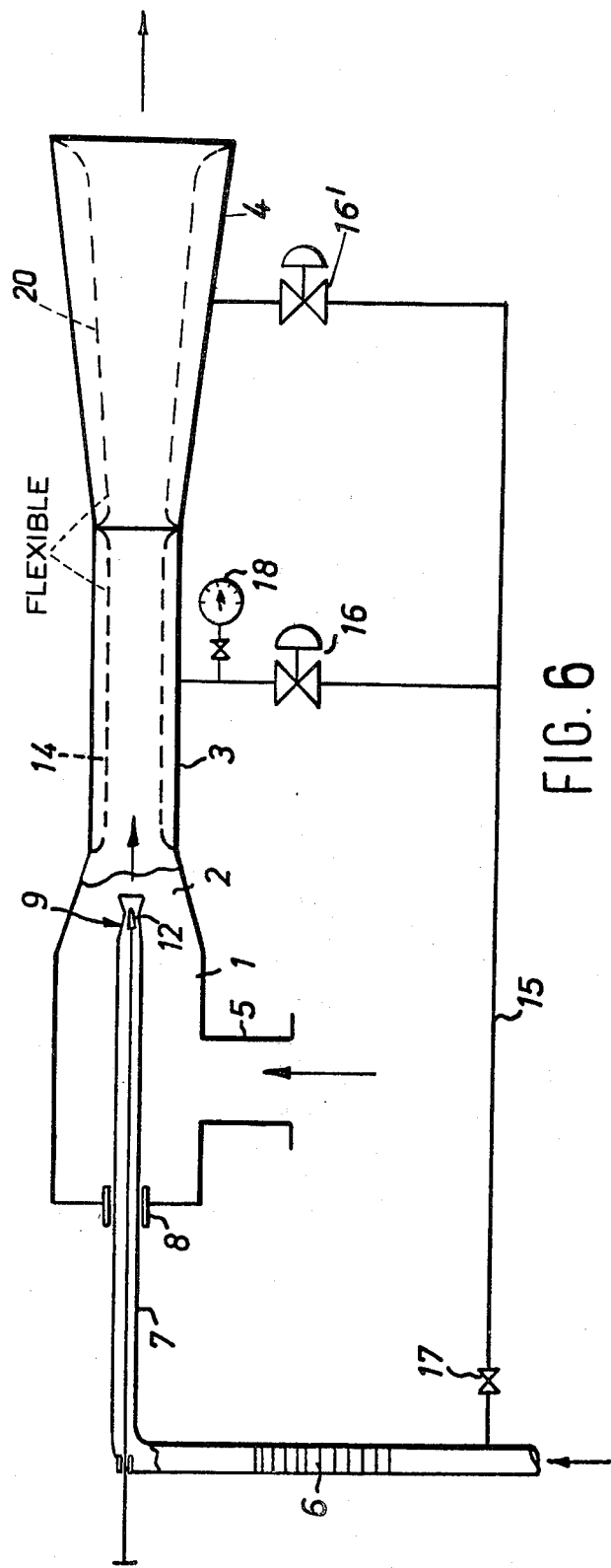

JET BOOSTERS

This invention relates to jet boosters. Jet boosters are used in the gas industry to enable the energy available in gas at high pressure to be used to entrain gas stored at low pressure, for example in a gasholder, and to compress it to an intermediate pressure required for a distribution system.

Hitherto jet boosters have been designed for a specified volumetric throughput at predetermined pressures of the driving and entrained gases and of the mixture leaving the booster. Efficiency suffers significantly when a booster is operated at other than design conditions. Existing jet boosters are therefore rather inflexible. Variations in throughput are usually obtained in practice by installing a number of relatively small units instead of a single relatively large one and meeting changes in demand by bringing individual jet boosters into service or shutting them down.

It is an object of the present invention to provide a more flexible jet booster.

It is a further object of the present invention to provide a jet booster of the kind in which high pressure driving fluid is used to entrain low pressure fluid induced into the booster, and compress it to an intermediate pressure, wherein an axial nozzle by which the driving fluid enters the booster has a plug which is longitudinally movable in the throat of the nozzle and varies in cross-section along its length so as to change the effective nozzle throat area when the plug is moved longitudinally and wherein the mixing throat of the jet booster is variable in cross-section.

By adjusting the cross-sectional areas of both the driving nozzle throat and the mixing throat to the optimum ratio for the other operating conditions of the jet booster high efficiency can be maintained with change of throughput.

The throat of the driving nozzle may also be the nozzle exit but when the ratio between the jet supply pressure and the entrained gas pressure is required to be grater than about 2.5 the driving nozzle is preferably of convergent-divergent shape and then the nozzle throat and nozzle exit are separated.

The plug may be of simple tapered shape preferably tapering in the downstream direction but it could be tapered in the opposite direction. When the driving nozzle is of convergent-divergent shape, in addition to the tapered plug at the nozzle throat there may be a further tapered plug at the nozzle exit, the cross-sectional areas at different positions along the lengths of the two plugs may be so related to one another and to those of the nozzle throat and exit respectively that there is a constant ratio of effective annular nozzle throat cross-sectional area to effective annular nozzle exit area. Alternatively adjustment may be provided for varying this ratio.

The mixing throat of the jet booster may be made variable in cross-section by lining the mixing throat with an inflatable flexible sleeve. Change of inflation pressure of the sleeve alters the cross-sectional area of the mixing throat.

The mixing throat is preferably parallel, that is to say cylindrical or of equal cross-section throughout its length, for a minimum length which is a small multiple, for example 5 to 7, of the minimum diameter of the parallel mixing throat when the sleeve is fully inflated. The sleeve preferably extends over all, or nearly all, the length of this parallel section.

Downstream of the mixing throat a jet booster has a divergent section or diffuser. The diffuser may also be made variable in cross-section, preferably by lining it with an inflatable sleeve similar to that for the mixing throat but shaped so as to maintain the divergent form of the diffuser when the sleeve is inflated. The inflatable sleeves in the mixing throat and diffuser may be separately controlled. Preferably the sleeve in the diffuser extends downstream from the entrance of the diffuser for a distance not less than seven times the diameter of the parallel mixing throat when restricted by the full inflation of the sleeve.

The distance of the driving nozzle throat upstream of the mixing throat entrance is also important to the efficiency of the jet booster. The driving nozzle is preferably mounted so that it can be moved longitudinally with respect to the mixing throat so that this distance can be adjusted.

An embodiment of the invention will now be described, by way of example only, with reference to the accompanying drawings in which:

FIG. 6 is a longitudinal section to FIG. 1 of yet another modification.

Figure 1:
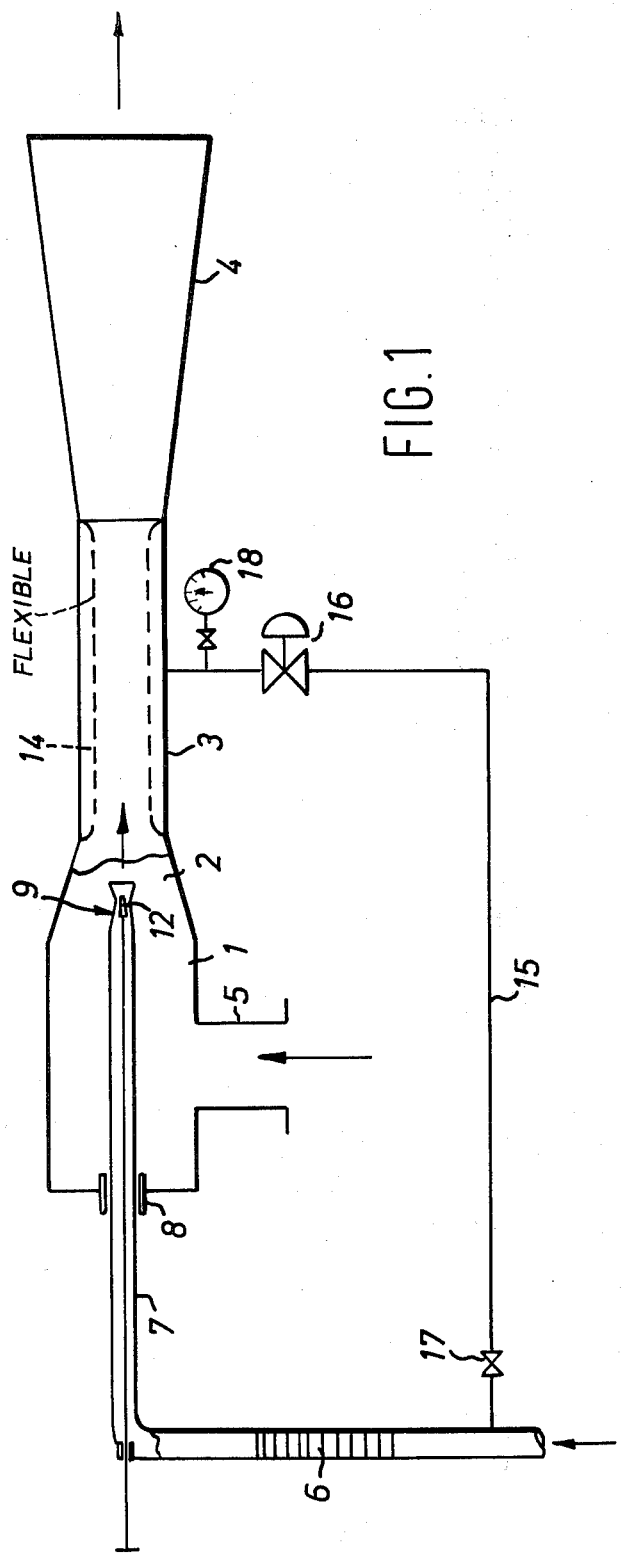
FIG. 1 is a diagrammatic longitudinal section of a jet booster according to the invention.

The jet booster shown in FIG. 1 comprises an induced gas entry chamber 1, a converging entrainment zone 2, a mixing throat 3, and a diffuser 4.

Figure 2:
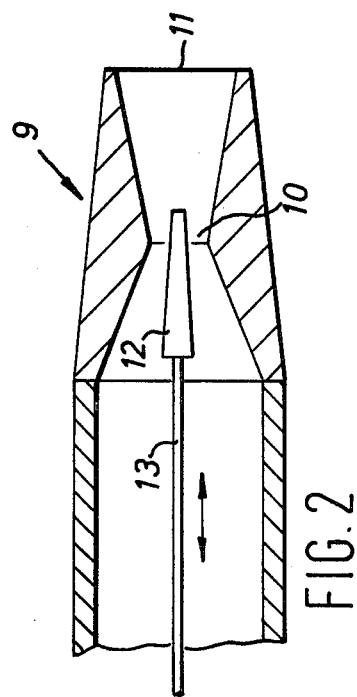
FIG. 2 is a fragmentary section on a larger scale of a part of FIG. 1.
Figure 4:
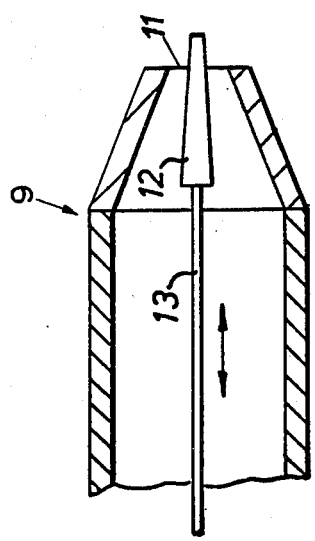
FIG. 4 is a fragmentary section similar to FIG. 2 of a further modification.

The entry chamber 1 is connected to the supply of induced gas at low pressure at an inlet 5. The outlet of the diffuser 4 is connected to the intermediate pressure gas distribution system. Driving gas at high pressure is connected by a flexible connection 6 to a tube 7 which enters the induced gas entry chamber 1 co-axially through a gland 8 in which it is longitudinally slidable. At the inner end of the tube 7 is the driving nozzle 9 which, as shown more clearly in FIG. 2, is of convergent-divergent shape, converging to a nozzle throat 10 and then diverging to a nozzle exit 11. FIG. 4 illustrates a nozzle without a divergent portion. Co-axially mounted within the throat 10 is a tapered plug 12 carried on the inner end of a longitudinally slidable rod 13 by which the position of the plug 12 within the throat 10 can be adjusted.

The mixing throat is lined with a flexible sleeve 14 sealed at the entrance and exit ends of the mixing throat to the surrounding walls. A pipe 15 connects high pressure gas, through a pressure controller 16, to the space between the mixing throat and its lining sleeve 14 to inflate the sleeve. A shut-off valve 17 in the pipe 15 enables the gas to be admitted to the pressure controller 16 and a pressure gauge 18 is connected to the pipe 15 between the pressure controller 16 and the sleeve 14.

Figure 5:
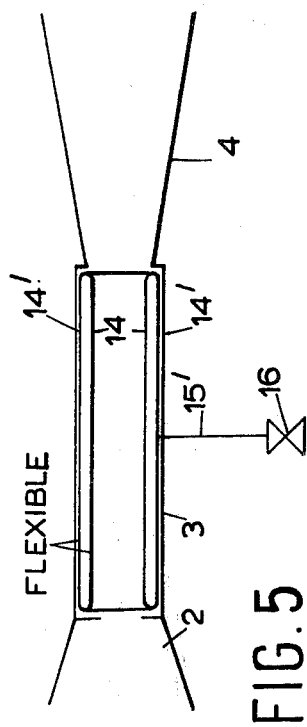
FIG. 5 is a fragmentary section similar to part of FIG. 1 of another modification.

Instead of being sealed to the walls of the mixing throat, the lining sleeve, as shown in FIG. 5, may have inner and outer tubular skins 14, 14' joined to one another at the ends. The double skin sleeve may be inflated by introducing gas between the skins. A connection 15' through the outer skin must be provided for inflating gas but the sleeve need otherwise merely be located within the mixing throat.

In use of the jet booster, the plug is set in relation to the driving nozzle, the distance of the driving nozzle from the entrance of the mixing throat is adjusted and pressure is admitted to the inflatable sleeve sufficient to contract the mixing throat cross-section to values predetermined for greatest operating efficiency of the jet booster for the pressures obtaining and the volumetric throughput required.

As shown in FIG. 6 an inflatable sleeve 20, of either of the forms described for the mixing tube, may be provided in line the diffuser 4 so that it may also be varied in cross-sectional area. The inflation of the diffuser sleeve may be controlled (separately if desired for example by a value 16') by a similar system to that for the mixing sleeve.

Figure 3:
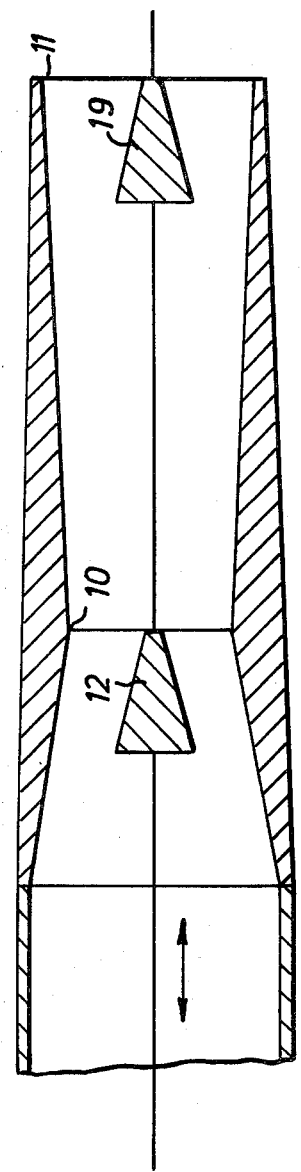
FIG. 3 is a fragmentary section similar to FIG. 2 of a modification.

In the modification of FIG. 3, in addition to the tapered plug 12 axially movable in the nozzle throat 10 there is a further tapered plug 19 axially movable with the plug 12 in the nozzle exit 11. The taper angles of the plugs 12 and 19 are such that there is a constant ratio of effective annular nozzle throat cross-sectional area to effective annular nozzle exit area. The plugs 12 and 19 may be movable jointly within the nozzle, the plugs being mounted on the same rod 13, but the position of the plug 19 may also be adjustable with respect to the plug 12. Alternatively, the plugs 12 and 19 may be movable independently of one another, for example by mounting the plug 19 on a rod longitudinally slidable in a bore in the rod 13 by which the tapered plug 12 is carried. In either case it would be possible to vary the area ratio at different axial settings.

I claim:

1. A jet booster of the kind in which high pressure driving fluid is used to entrain low pressure fluid induced into said booster and compress it to an intermediate pressure, comprising an inlet opening for low pressure fluid, an axial driving nozzle within said inlet opening and open to a supply duct for high pressure driving fluid, said driving nozzle defining a nozzle throat and having a nozzle exit by which said driving fluid enters said booster, a plug which is longitudinally movable in said nozzle throat and which varies in cross-section along its length so as to change the effective area of said nozzle throat when said plug is moved longitudinally, a cylindrical portion forming the mixing throat of said booster which is variable in cross-section, first control means for longitudinally moving the plug in said nozzle throat and second control means independent of said first control means and simultaneously but independently variable therewith for varying the cross-section of said cylindrical portion, said second control means including a conduit leading to said supply duct for high pressure driving fluid, said conduit including a pressure controller therein.

2. A jet booster according to claim 1 in which said driving nozzle is convergent so that said nozzle throat is also the nozzle exit.

3. A jet booster according to claim 1 in which said driving nozzle is of convergent-divergent shape, so that the nozzle throat and nozzle exit are separated.

4. A jet booster according to claim 3 in which in addition to said plug at said driving nozzle throat, there is provided a second plug which is longitudinally movable in said nozzle exit and varies in cross-section along its length so as to change the effective area of said nozzle exit when said second plug is moved longitudinally.

5. A jet booster according to claim 1 in which a flexible skin lines said mixing throat of said booster and is sealed to the walls of said mixing throat along each edge to form an inflatable sleeve, a change of inflation pressure in said sleeve altering the cross-sectional area of said mixing throat.

6. A jet booster according to claim 1 in which a flexible double-skin sleeve lines said mixing throat of said booster, a change of inflation pressure in said sleeve altering the cross-sectional area of said mixing throat.

7. A jet booster according to claim 1 in which a diffuser is attached downstream of said mixing throat and in which said diffuser is lined with an inflatable flexible sleeve for varying the cross-sectional area of said diffuser.

8. A jet booster according to claim 1 in which said driving nozzle is movably mounted in said booster, such that it can be moved longitudinally with respect to said mixing throat without significantly affecting the effective area of the inlet opening for low pressure fluid.

* * * * *